US008284716B2

(12) United States Patent
Martin et al.

(10) Patent No.: US 8,284,716 B2
(45) Date of Patent: Oct. 9, 2012

(54) METHODS OF MAINTAINING CONNECTION WITH, AND DETERMINING THE DIRECTION OF, A MOBILE DEVICE

(75) Inventors: Paul Maxwell Martin, Hartley Wintney (GB); Riki Benjamin Dolby, Hartley Wintney (GB)

(73) Assignee: M.M.I. Research Limited, Hampshire (GB)

( * ) Notice: Subject to any disclaimer, the term of this patent is extended or adjusted under 35 U.S.C. 154(b) by 660 days.

(21) Appl. No.: 12/162,569

(22) PCT Filed: Jan. 30, 2007

(86) PCT No.: PCT/GB2007/000302
§ 371 (c)(1),
(2), (4) Date: Sep. 23, 2008

(87) PCT Pub. No.: WO2007/088338
PCT Pub. Date: Aug. 9, 2007

(65) Prior Publication Data
US 2009/0036143 A1    Feb. 5, 2009

(30) Foreign Application Priority Data

Jan. 31, 2006    (GB) .................................. 0601952.5

(51) Int. Cl.
*H04W 4/00*    (2009.01)
(52) U.S. Cl. ........................................ 370/328; 455/440
(58) Field of Classification Search .................. None
See application file for complete search history.

(56) References Cited

U.S. PATENT DOCUMENTS

| 6,021,330 A | 2/2000 | Vannucci |
| 6,052,597 A | 4/2000 | Ekstrom |
| 6,483,459 B1 | 11/2002 | Hou et al. |
| 6,549,779 B1 * | 4/2003 | Muller et al. ................. 455/439 |
| 6,980,527 B1 | 12/2005 | Liu et al. |

(Continued)

FOREIGN PATENT DOCUMENTS

EP    1 096 711 A1    5/2001

(Continued)

OTHER PUBLICATIONS

International Search Report Application No. PCT/GB 2007/000302 mailed on Jul. 27, 2007.

(Continued)

*Primary Examiner* — Anh-Vu Ly
(74) *Attorney, Agent, or Firm* — Nixon Peabody LLP; Jeffrey L. Costellia

(57) ABSTRACT

A method of determining the direction of a mobile communication device, the method comprising receiving an encoded locator signal from the device over a wireless link; decoding the locator signal to generate a decoded output; and measuring the direction of arrival of the locator signal by analyzing the decoded output.

A method of maintaining a connection with a mobile communication device, the method comprising establishing a connection with the device; receiving a request from the device to release the connection; and repeatedly sending a request for information to the device to prevent the device from releasing the connection.

A method of maintaining communication with a mobile cellular communication device, the method comprising establishing a connection with the device by broadcasting a first cell configured with a first location code to the device; and re-establishing the connection with the device after the device has released the connection by broadcasting a second cell configured with a second location code to the device.

11 Claims, 4 Drawing Sheets

U.S. PATENT DOCUMENTS

| | | | |
|---|---|---|---|
| 7,054,268 B1 * | 5/2006 | Parantainen et al. | 370/231 |
| 7,782,818 B2 * | 8/2010 | Hurtta et al. | 370/331 |
| 7,792,078 B2 * | 9/2010 | Haumont et al. | 370/331 |
| 2001/0009544 A1 | 7/2001 | Vanttinen et al. | |
| 2002/0107019 A1 * | 8/2002 | Mikola et al. | 455/436 |
| 2004/0017798 A1 | 1/2004 | Hurtta et al. | |
| 2006/0089137 A1 * | 4/2006 | Howell et al. | 455/423 |
| 2007/0063897 A1 * | 3/2007 | Matsuda | 342/463 |
| 2007/0201436 A1 * | 8/2007 | Kim et al. | 370/352 |

FOREIGN PATENT DOCUMENTS

| | | |
|---|---|---|
| EP | 1 199 903 A2 | 4/2002 |
| WO | WO 90/09082 A | 8/1990 |
| WO | WO 00/11798 | 3/2000 |
| WO | WO 01/91317 A1 | 11/2001 |
| WO | WO 02/43266 A2 | 5/2002 |
| WO | WO 2005/011317 A1 | 2/2005 |
| WO | WO 2007/010220 A2 | 1/2007 |

OTHER PUBLICATIONS

Written Opinion of the International Searching Authority; Application No. PCT/GB2007/000302 mailed on Jul. 27, 2007.

Shiann-Shiun Jeng et al.: "Performance Evaluation of DOA Based Beamforming in W-CDMA System" VTC Fall 2001. IEEE 54$^{th}$ Vehicular Technology Conference Proceedings. Atlantic City, NJ, Oct. 7-11, 2001, New York, NY: IEEE, US, vol. 1 of 4. Conf. 54, Oct. 7, 2001, pp. 2652-2656.

Hannes Federrath, "Security in Mobile Communications: Protection in GSM networks, mobility management and multilateral security" DuD Technical Articles,—Braunschweig, 1999, pp. 7, 80, 81 and 246, Wiesbaden: Vieweg.

Fred Piper et al. "Cryptographic Solutions for Voice Telephony and GSM", Network Security, Dec. 1998, pp. 14-19, Westminster, London.

3GPP TS 33.102 Version 3.13.0, Release 1999, Chapter 6.5.

3GPP TS 24.008 Version 3.19.0, Release 1999, Chapter 4.1.1.1.1.

Notice of Opposition against EP 1 982 430, Jul. 15, 2011 (Application No. 07705068.0—Reference No. P107418EP-PCT).

International Search Report issued by Swedish Patent Office, Oct 1, 2001 (International Application No. PCT/FI01/00499).

International Search Report issued by European Patent Office, Apr. 2, 2001 (International Application No. PCT/DE 2003/002495)—English Version.

International Search Report issued by European Patent Office, Apr. 2, 2001 (International Application No. PCT/DE 2003/002495)—German Version.

Seunghyun.M et al., "Direction-of-Arrival Tracking Scheme for DS/CDMA Systems: Direction Lock Loop," IEEE Transactions on Wireless Communications, Jan. 2004, vol. 3, No. 1, pp. 191-202.

Buon Kiong.L et al., "A Novel Direction-of-Arrival Estimation Algorithm for WCDMA," Konferensen RadioVetenskap och Kommunikation (RVK), Stockholm, Sweden, Jun. 2002.

Samir.K et al., "Adaptive Multiuser Detection and Beamforming for Interference Suppression in CDMA Mobile Radio Systems," IEEE Transactions on Vehicular Technology, Sep. 1999, vol. 48, No. 5, pp. 1341-1355.

Kazi A. Zahid, "Space-Time Processing for the Wideband-CDMA System," Thesis submitted to the faculty of the Virginia Polytechnic Institute and State University, Jan. 2001.

* cited by examiner

Figure 5

METHODS OF MAINTAINING CONNECTION WITH, AND DETERMINING THE DIRECTION OF, A MOBILE DEVICE

BACKGROUND OF THE INVENTION

Field of the Invention

The present invention relates to a method, and associated apparatus, for determining the direction of a mobile communication device. The present invention also relates to a method, and associated apparatus, for maintaining a connection with a mobile communication device. Typically, although not exclusively, the device is a Third Generation (3G) device.

Recent availability of Third Generation mobile phone and related devices leads to a requirement for new methods to locate 3G phones which use Code Division Multiple Access (CDMA) techniques on the air interface. New techniques for tracking the phones are required which are completely different to the techniques used to track GSM phones.

Note that 3G networks include added security protection via a mechanism known as mutual authentication. This technique involves a two step authentication where a) the User Equipment (UE) is authenticated with the network and b) the network is authenticated with the UE. In GSM, only a) applies, leading to the possibility of a security attack via a false base station. Mutual authentication inhibits the conventional mechanism for establishing a mobile phone as an RF beacon and enabling direction finding equipment to locate the beacon on a known frequency/code/timeslot. This is because the UE will ignore messages which are not from a suitably authenticated network device leading to UE transmissions which are abruptly terminated at such a point in the protocol exchanges where the UE determines that the network it is talking to has incorrect or missing "Integrity" protection data when it is mandated by the specifications.

UMTS networks transmit over the air using Code Division Multiple Access (CDMA) technology. This means that the signal from a single 3G transmission device is very hard to distinguish from background noise, because the transmission is scrambled using a pattern that spreads the signal power across a wide frequency range. It is possible to decode the signal from a single device if you know the scrambling code that was used at the transmitter.

The spread-spectrum nature of the CDMA signal makes direction finding in the frequency domain much harder because the transmitted signal is very hard to distinguish from noise.

BRIEF SUMMARY OF THE INVENTION

A first aspect of the invention provides a method of determining the direction of a mobile communication device, the method comprising receiving an encoded locator signal from the device over a wireless link; decoding the locator signal; and determining the direction of the device by measuring the direction of arrival of the decoded locator signal.

The first aspect of the invention provides a method suitable for determining the direction of a CDMA device.

A second aspect of the invention provides a method of maintaining a connection with a mobile communication device, the method comprising establishing a connection with the device; receiving a request from the device to release the connection; and repeatedly sending a request for information to the device to prevent the device from releasing the connection.

A third aspect of the invention provides a method of maintaining communication with a mobile cellular communication device, the method comprising establishing a connection with the device by broadcasting a first cell configured with a first location code to the device; and re-establishing the connection with the device after the device has released the connection by broadcasting a second cell configured with a second location code to the device.

BRIEF DESCRIPTION OF THE DRAWINGS

Embodiments of the invention will now be described with reference to the accompanying drawings, in which.

DETAILED DESCRIPTION OF THE INVENTION

Figure 1:
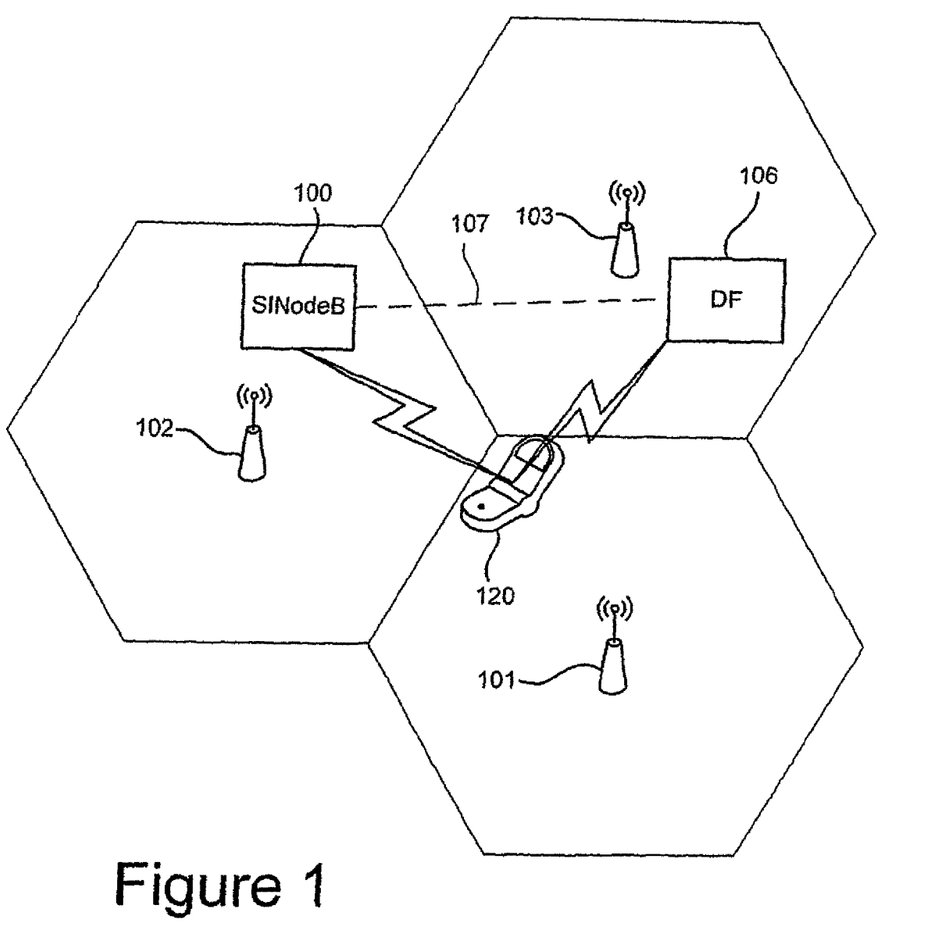
FIG. 1 shows a system for determining the direction of a 3G mobile communication device.

FIG. 1 shows a 3G network comprising three NodeBs 101-103 broadcasting to three cells by downlink transmissions each having a unique downlink scrambling code. On moving into the vicinity of the three NodeBs, a User Equipment device (UE) 120 evaluates on which NodeB to camp.

The UE 120 is required to constantly re-evaluate the signals from cells around it. It does this to ensure that during a connection (data or voice) it is always communicating with the best (most appropriate) NodeB. However a 3G UE will spend most of its time when not transmitting voice or data traffic in an idle state. In this idle state the UE will monitor the strength of the serving NodeB and other neighbour NodeBs, and if the criteria specified by the network are met then it will perform a cell reselection converting one of the previous neighbour NodeBs into the new serving NodeB. If this new serving NodeB is in a different location or routing area then the UE must perform a location or routing area update procedure to inform the network of its new location. This is done so that the network will always have an idea of where the UE is in the network, so that in the event of an incoming call request to the UE the network can use the minimum amount of resources to request the UE to establish a signaling connection.

Each NodeB transmits broadcasted information that serves two main purposes. First, some of this information is transmitted using well know codes and data patterns that allow the UE to recognise that the Radio Frequency (RF) signal being received is actually a UMTS cell and also allows the UE to perform power measurements on the received signal. Second, descriptive information about the cell is broadcast. This system information is transmitted in the form of System Information Blocks (SIBS) which describe many parameters of the NodeB and provide enough information for the UE to identify the mobile network that the NodeB belongs to, and also to establish a signaling connection if it needs to.

Figure 2:
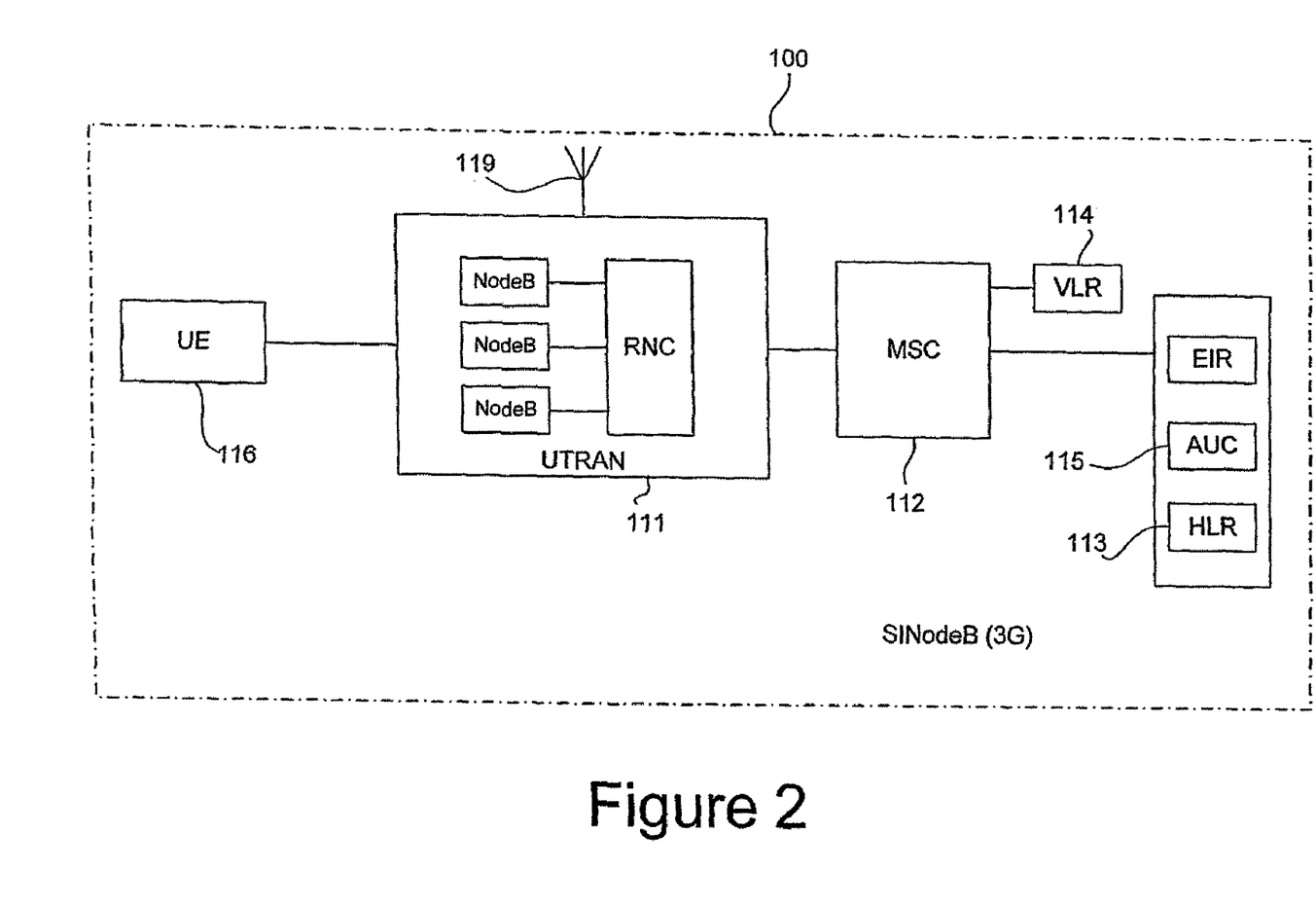
FIG. 2 shows a Separately Introduced NodeB (SINodeB)

FIG. 2 shows a Separately Introduced NodeB (SINodeB) 100. The SINodeB 100 is configured to acquire an identity parameter from a UE registered with the 3G network of FIG. 1. This is achieved by emulating a NodeB using a method specially adapted to the UMTS protocol, as described in further detail below.

The SINodeB 100 is typically a mobile device, which may be housed in a vehicle. In use, the SINodeB 100 is moved to an area, and operated to acquire identity parameters from a set of User Equipment devices (UEs) registered with the 3G network in that area. Alternatively the SINodeB 100 may be permanently located in an area of interest. In both cases, the SINodeB 100 effectively transmits a false cell broadcast which is not under the control of the 3G network providing coverage to that area.

In order to persuade the UE to move over to the SINodeB 100, certain criteria must be met. Primarily the transmission must be received at the UE with a higher signal strength. Even once the UE has made the decision that the SINodeB 100 is preferential it would normally be considered necessary to pass the UMTS security procedures in order to be able to gather any useful information or perform any useful tasks.

It is not necessary to exactly emulate all the configuration of an existing NodeB for it to be a suitable candidate for a UE to connect to. This makes the task of configuring the SINodeB 100 much simpler. The reason for this is that the broadcasted system information defines the configuration of the cell that is transmitting that data, and cells within the same network will have different configurations, so the UE always looks at the data from the current cell to determine the necessary information.

The key parameters in the false cell broadcast that need to be considered for changing are as follows:
Cell Frequency
Primary Scrambling code
Mobile Country Code (MCC) [—which country this cell is in]
Mobile Network Code (MNC) [—which network this cell belongs to]
Location area code (LAC)
Routing area code (RAC)
Cell power
SIB value tags [—Value tags are use by the UE to detect if SIB information has changed between reads of the SIBs]
Contents of SIB18 and SIB11 for serving cell [—SIB 11 contains measurement control information to be use by the UE in idle mode/SIB 18 contains PLMN ids of neighbour cells to be considered in idle and connected mode]

The MCC and MNC must be the same as the serving cell for the UE to consider the SINodeB to be in the same network.

The Cell Frequency must be the same as the serving cell to make the process as easy as possible—interfrequency reselections have more complex criteria and processes.

There are several options for configuring the other parameters transmitted by the SINodeB:

1) Same LAC/RAC and Primary Scrambling code, different SIB value tags—This completely mimics the serving cell, and allows the SINodeB to actively grab the UE.

2) Different LAC/RAC and Primary Scrambling code—where Scrambling code is present in the SIB11 of the serving cell. This is mimicking a neighbour NodeB that the serving NodeB has been instructing the UE to perform measurements on—thus ensuring that the UE is actively searching for a cell with the same key characteristics as that being transmitted by the SINodeB (primarily scrambling code, and frequency). This causes a UE to perform a cell reselection to the SINodeB if the SINodeB transmission is of sufficiently higher power than the serving NodeB. The amount by which the SINodeB needs to be a stronger signal is defined in SIB3 of the serving NodeB.

3) Different LAC/RAC and Scrambling code—no reference in SIBS of the serving NodeB.

Once a suitably strong and configured cell is being transmitted, the UEs in the target area will perform a cell reselection to the SINodeB and establish an RRC connection for the purpose of performing a location updating procedure. The location update is required because the LAC of the SINodeB is different from the old serving SINodeB. Once the RRC connection is established the SINodeB has the opportunity to perform other signaling procedures as desired.

The UMTS protocol is designed to enhance the security and identity protection features in GSM. To this end, authentication and integrity mechanisms are used in addition to the temporary identities found in GSM. These temporary identities avoid the frequent transmission of the identity of the IMSI and the IMEI, because once the network has assigned the phone a temporary identity then it maintains a mapping from that new identity to the IMSI.

Mechanisms exist to allow the network to interrogate a phone for its IMSI and IMEI and these are used for the first connection of a phone to the network or when an error has occurred and the network needs to re-establish the correct mapping between a temporary identity (such as a TMSI) and its associated real identity (such as an IMSI). In normal network operation almost all signaling between the UE and the network must be performed after the authentication procedure has been completed successfully and integrity has been enabled on the signaling connection. This makes the falsification or modification of signaling by a third party effectively impossible.

Unless a NodeB is provided with a mechanism to successfully pass the authentication and integrity procedures, then the UMTS protocols are designed that almost no useful communication can be achieved with the UE. However there are "gaps" in the UMTS protocols that allow the IMSI, IMEI and TMSI to be retrieved from the UE by the SINodeB 100 without requiring these security mechanisms.

These "gaps" are described in 3GPP TS 33.102 version 3.13.0 Release 1999, and in 3GPP TS 24.008 version 3.19.0 Release 1999. The relevant portions of these protocols will now be described.

3GPP TS 33.102 Version 3.13.0 Release 1999

This protocol specifies in Section 6.5 that all signaling messages except the following shall be integrity protected:
HANDOVER TO UTRAN COMPLETE
PAGING TYPE 1
PUSCH CAPACITY REQUEST
PHYSICAL SHARED CHANNEL ALLOCATION
RRC CONNECTION REQUEST
RRC CONNECTION SETUP
RRC CONNECTION SETUP COMPLETE
RRC CONNECTION REJECT
RRC CONNECTION RELEASE (CCCH only)
SYSTEM INFORMATION (BROADCAST INFORMATION)
SYSTEM INFORMATION CHANGE INDICATION Thus these messages cannot be integrity protected under any circumstances.

3GPP TS 24.008 Version 3.19.0 Release 1999

This protocol specifies a list of messages which the UE can respond to, in certain circumstances, without first having integrity protected the network. Specifically, the protocol states the following:

Except the messages listed below, no layer 3 signalling messages shall be processed by the receiving MM and GMM entities or forwarded to the CM entities, unless the security mode control procedure is activated for that domain.
MM messages:
AUTHENTICATION REQUEST
AUTHENTICATION REJECT
IDENTITY REQUEST LOCATION UPDATING ACCEPT (at periodic location update with no change of location area or temporary identity)
LOCATION UPDATING REJECT
CM SERVICE ACCEPT, if the following two conditions apply:
no other MM connection is established; and
the CM SERVICE ACCEPT is the response to a CM SERVICE REQUEST with CM SERVICE
TYPE IE set to 'emergency call establishment'
CM SERVICE REJECT
ABORT
GMM messages:
AUTHENTICATION & CIPHERING REQUEST
AUTHENTICATION & CIPHERING REJECT
IDENTITY REQUEST
ATTACH REJECT
ROUTING AREA UPDATE ACCEPT (at periodic routing area update with no change of routing area or temporary identity)
ROUTING AREA UPDATE REJECT
SERVICE REJECT
DETACH ACCEPT (for non power-off)
CC messages:
all CC messages, if the following two conditions apply:
no other MM connection is established; and
the MM entity in the MS has received a CM SERVICE ACCEPT message with no ciphering or
integrity protection applied as response to a CM SERVICE REQUEST message, with CM SERVICE
TYPE set to 'Emergency call establishment' sent to the network.

Therefore an RRC Connection can be set up without requiring integrity protection, since the RRC connection messages are listed as not requiring integrity protection in 3GPP TS 33.102 version 3.13.0 Release 1999. After an RRC Connection has been established between the SINodeB and the UE, for the purpose of a location update procedure a series of MM Identity Requests are sent by the SINodeB 100 to retrieve the UE identification information. Again, the UE responds to these MM Identity Requests without requiring integrity protection because MM Identity Request is specified in the list given above in 3GPP TS 24.008 version 3.19.0 Release 1999.

Specifically, the series of messages between the UE and the SINodeB is as follows:
UE <-> SINodeB
-> RRC Connection Request
<- RRC Connection Setup
-> RRC Connection Setup Complete
-> MM Location Update Request
<- MM Identity Request (Requesting IMSI)
-> MM Identity Response (IMSI)
<- MM Identity Request (Requesting IMEI)
-> MM Identity Response (IMEI)
<- MM Identity Request (Requesting IMEISV)
-> MM Identity Response (IMEISV)

When the UE sends the MM Location Update Request, it also starts an LAC update timer. The SINodeB ignores this request. If the UE does not receive a valid response to the MM Location Update Request within a predetermined time, then the UE resends the MM Location Update Request. This process is repeated a few times and then the UE aborts the connection.

Thus by sending the series of three MM Identity Requests straight after the RRC Connection is established, and before the UE aborts the connection, the SINodeB can receive the MM Identity Response messages from the UE without requiring integrity protection.

Once the identity information has been collected, the SINodeB rejects the location update request thus preventing the UE from repeatedly trying to camp on to the SINodeB.

In the circumstances described above, once the UE establishes the RRC connection it will transmit a Location Update Request message. In normal operation the network will then perform the authentication and integrity procedures, that ensure that the UE and the network are both confident that the other is legitimate. After this, the network will send an integrity protected location update accept message. The UE is required by the standards to ignore this message if it is not successfully integrity protected, so that a SINodeB is effectively prevented from performing this step successfully.

Once the UE sends the Location Update Request message it starts a timer, and if a successful location update accept is not received before the timer expires the UE will abort the attempt and then retry. There is a retry counter and if the UE has retried too many times, it will abort the attempts and move on to another cell.

Normal network protocol message flows will result in the RRC Connection being dropped if the UE aborts the connection, this is either because the network drops the connection for its own reasons or because the UE has requested it.

The release of the RRC connection is controlled by the network and it is possible in the SINodeB to try to maintain the connection once the UE has requested that it be released.

Certain messages and procedures are not required to be integrity protected and so these can be used to continue communication with the UE, independently from the location update procedure. An example of this is the RRC UE Capability request and response messages.

So a flow that allows the RRC Connection to be maintained for a few minutes could be like this:
<-> Establish RRC Connection
-> UE sends location update request message and starts LAC update timer
<-> Network repeatedly sends UE Capability Request message and the UE replies (This ensures that the RRC Connection is kept active even though the network has not replied to the location update request)
-> After a few seconds the UE sends an RRC Signalling connection release indication, requesting the release of the RRC Connection. The SINodeB ignores this message.
-> LAC update timer expires—so the UE resends the location update
<-> Procedure repeats a few times and then the UE aborts the connection completely and searches for other cells.

During this process the RRC UE Capability Request messages (or some other information request) are used to trick the RRC protocol layer into believing that the link is active and thus even when the Location update procedure times out, the RRC Connection is maintained.

This RRC Connection can be maintained for several minutes with no indication to the UE user that there is anything happening. During this time it is thus possible to use the transmissions from the UE for direction finding purposes, as described below.

If a longer period of continuous transmission is required then all that is necessary is to cause the UE to attempt to perform another location update procedure again. This can be achieved by broadcasting a second cell with a different LAC from the SINodeB. Thus in this case the SINodeB first establishes an RRC connection with the device where the SINodeB is broadcasting a cell configured with a first LAC code to the UE; detects that the UE has released the RRC connection, and in response to that detection immediately transmits a second cell with a second LAC code to cause the UE to re-establish the RRC connection with the SINodeB. This process can then be repeated with different LAC codes to maintain the RRC connection indefinitely.

Instead of transmitting the different LAC codes one after the other in the way described above, the multiple NodeBs (which are substantially co-located in the SINodeB) may simultaneously transmit the cells with different LACs.

Thus, by the methods described above, the SINodeB establishes and maintains a "blind call" with the UE: that is a signal connection which does not cause the UE to provide a visual or audible alert.

By following the process described above, the SINodeB 100 can maintain an RRC connection for a prolonged period of time. For the purposes of direction finding however it is also necessary to ensure that the UE is transmitting on a known and fixed scrambling code.

In the real network the received signal has to go through many stages of demultiplexing/decoding before useful user data is output. This is because the data transmitted over the air consists of multiple logical channels that are mapped onto transport channels. These transport channels are then mapped onto physical channels. At each stage of multiplexing, different channels that are mapped onto the same carrier channel must be differentiated. This is done using additional coding steps.

For example the last stage in this process, involves combining all the physical channels into a single UE transmission. The physical channels are all treated with different channelisation codes and then they are summed and the result is treated with the scrambling code that makes the UE transmission distinguishable from other UEs.

Figure 3:
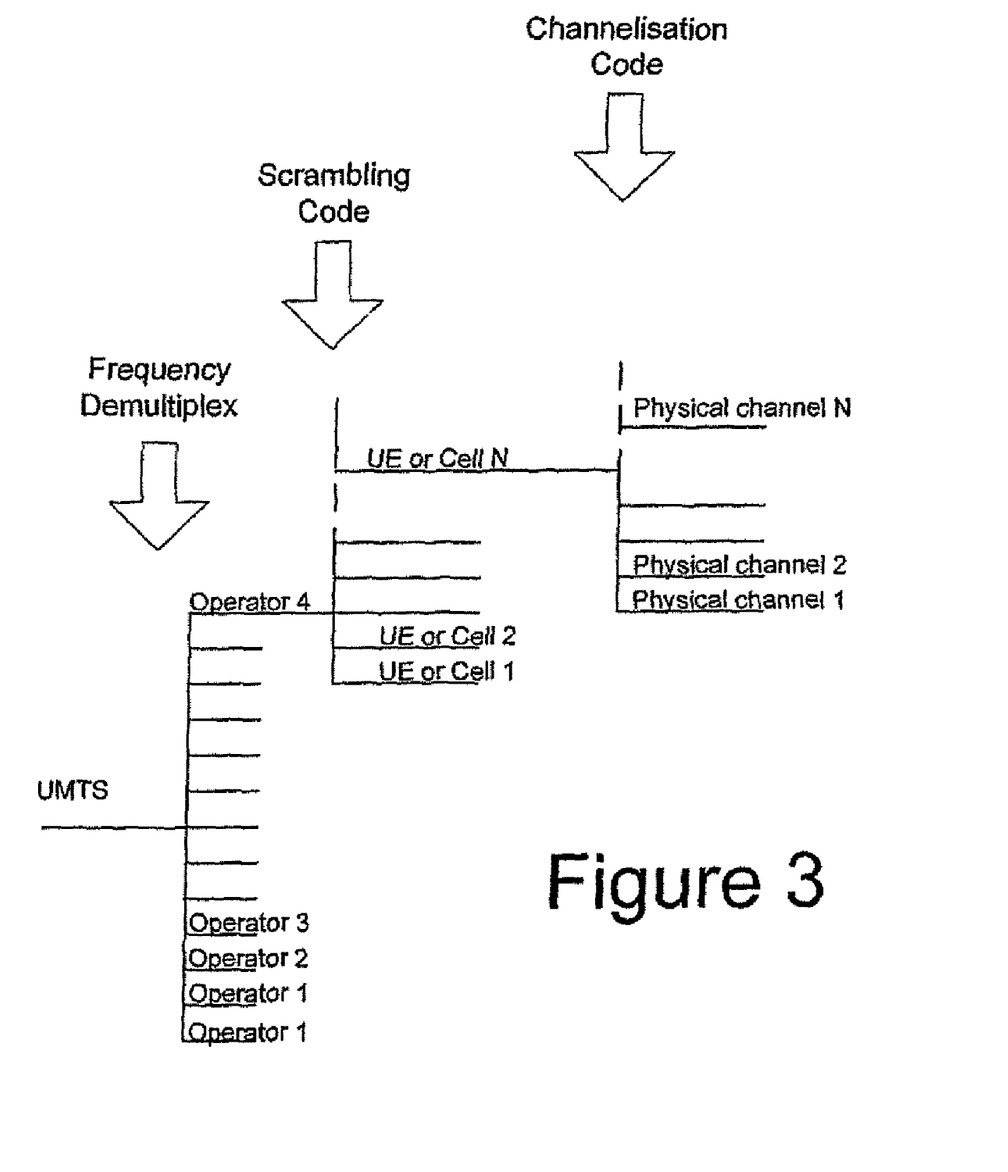
FIG. 3 shows various channel allocations in a CDMA system.

The decoding/demultiplexing process performed by the SINodeB and the UE are illustrated in FIG. 3. The UMTS spectrum is divided into multiple frequency channels (12 in the UK), each defined by a frequency band with a central frequency defined by a UARFCN and associated with a particular Operator. In the uplink direction each channel is decoded by a NodeB using a respective uplink descrambling code, each uplink descrambling code being associated with a respective UE. After descrambling, the signal is further decoded using a number of channelisation codes, to give N dedicated physical channels each associated with a respective channelisation code. In the downlink direction each channel is decoded by the UE using a respective downlink scrambling code, each downlink scrambling code being associated with a respective cell.

In UMTS there are two main ways in which the UE is able to make a signaling connection to the network. The first is using the RACH channel, which is a form of random access mechanism in which all the UEs compete for a shared communications resource. The FACH channel is used by the network to respond to signaling received on the RACH channel. In this case the message will be broadcast so each UE will be able to receive it but it will have an identifier detailing which UE the message is targeted at. When the mechanism where the RACH and FACH channels are used for communication, the UE is usually said to be in the cellFACH state. This is used by the network for low bandwidth signaling or data transfer. The location update process is usually carried out in cellFACH because this signaling process is short and it is not worth allocating dedicated network resource to this short and fairly regular procedure.

In the case where the aim of maintaining the connection is for direction finding, the shared communication mechanism of cellFACH is not helpful, as many UEs will be using the same codes.

When establishing an RRC connection, the SINodeB instructs the UE to use a dedicated channel (cellDCH state), associated with a chosen uplink scrambling code and a chosen channelisation code. In this case the RRC Connection Setup message describes the dedicated channel (DCH) that the UE and network will use to communicate.

Once the UE is transmitting on a specified DCH, a direction finder 106 can perform direction finding using the technique described below.

Direction finding in 3G differs from that in 2G because the 2G signal is purely in the frequency domain, while the 3G signal is in the code domain. This means that in 2G a direction finding algorithm can work by analyzing the timing differences between suitably filtered signals received at each of the antennas in the antenna array. In 3G it is necessary to produce a suitable input to provide to the direction finding algorithm. Effectively this means that the filtered signal received at each antenna in the array needs to be independently tracked and descrambled/decoded.

Therefore the direction finder 106 determines the direction of the encoded 3G locator signal by detecting the locator signal with an array of N antennas, separately decoding an output of each antenna to generate N decoded outputs, and measuring the direction of arrival of the locator signal by analyzing the N decoded outputs.

Figure 4:
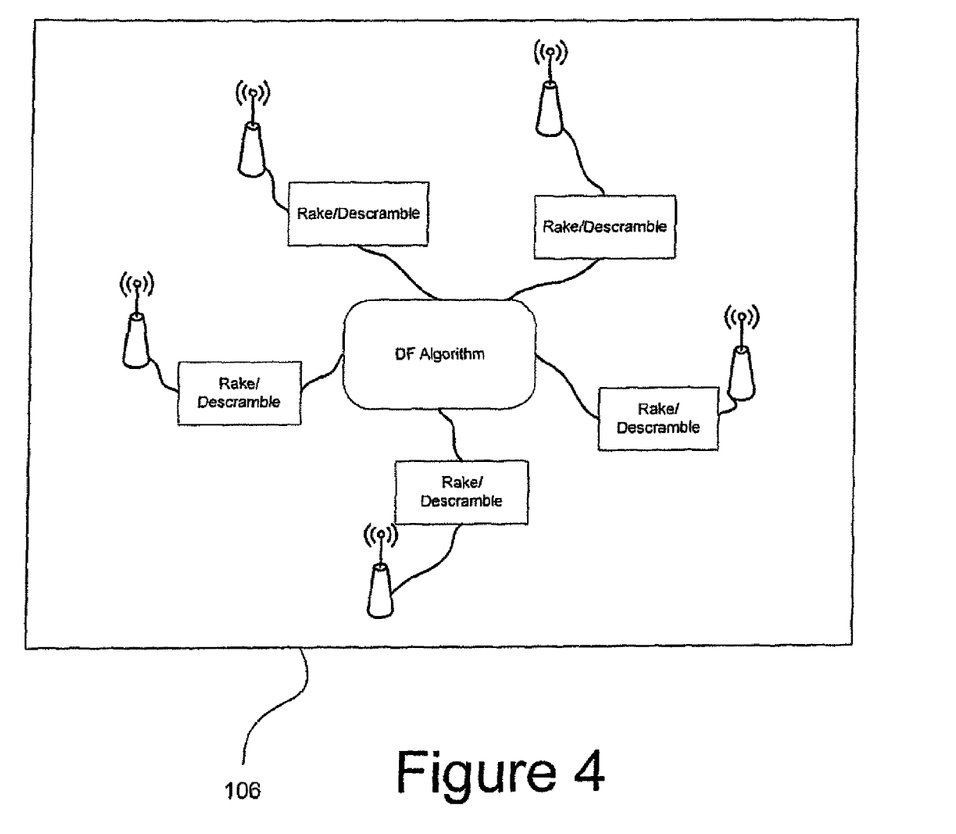
FIG. 4 shows a direction finder.

The direction finder 106 is illustrated in further detail in FIG. 4, and comprises a processor running a DF algorithm, an array of five antennas, and an array of five RAKE receivers and descramblers, each receiving encoded locator signals from a respective antenna and generating a decoded output to the DF algorithm.

Each RAKE receiver has a collection of independent sub-receivers/descramblers. Each rake subreceiver/descrambler is configured to decode and track an encoded locator signal associated with a different propagation path from the device. For instance one rake subreceiver/descrambler might decode and track a main propagation path on a direct line of sight with the device and another rake subreceiver might decode and track a secondary propagation path caused by reflection from a nearby object. Thus each rake subreceiver/descrambler generates two outputs:

timing information: that is, data indicating the phase offset of the rake subreceiver/descrambler; and
signal amplitude data.

In a conventional rake receiver, a combiner block coherently sums the signal amplitude data from all rake subreceivers and the coherent sum is then used as the input into the next decoding process in the receive chain. In contrast, the rake receivers/descramblers of FIG. 4 do not pass on such a coherent sum to the DF algorithm. For direction finding, it is not the coherently summed signal amplitude data that is of interest, but the timing information and the signal amplitude data associated with each propagation path. Hence the rake receivers/descramblers input this timing information and signal amplitude data to the DF algorithm.

The rake receivers/descramblers are all synchronized to a single accurate timing source, to ensure that the small delays between receiving a signal at each antenna in the array are accurately represented in the timing information.

Figure 5:
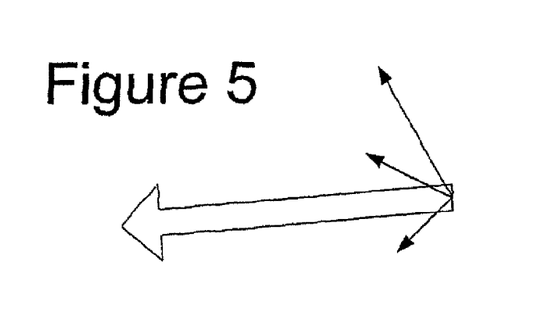
FIG. 5 shows a display format.

The DF algorithm then performs correlation functions using the timing information and signal amplitude data to generate an output which can be displayed to a user. An example of how the information might be presented is shown FIG. 5. A number of arrows are displayed on a map, with the length and/or width of the arrow indicating the signal amplitude, and the direction of the arrow indicating the direction which is deduced from the timing information. Each arrow is associated with a different propagation path from the device.

Given that there is a small risk that the uplink scrambling code chosen by the SINodeB for the target UE is already in use by another UE connected to the real network, it will be necessary to check that there is no UE transmission using the scrambling code about to be allocated.

This can be performed in one of two ways:
1. The direction finder stores a list A of possible uplink scrambling codes, and checks for uplink signals on all of these scrambling codes, giving a subset B of the list A. It then allocates a scrambling code C which is in list A but not list B. It then sends data to the SINodeB which identifies the scrambling code C, and the SINodeB assigns that scrambling code to the UE.
2. The SINodeB sends a message to the direction finder identifying a scrambling code which it proposes to use. The direction finder checks for an uplink signal using the proposed code. If no uplink signal is found then the direction finder informs the SINodeB, and the SINodeB assigns that scrambling code to the UE. If an uplink signal is found then the direction finder informs the SINodeB, and the SINodeB initiates another check using a different proposed code. This is repeated until a scrambling code is assigned to the UE.

By performing only a single decoding step (using the uplink descrambling code) this technique provides a descrambled signal containing all RF power from the target UE. The descrambled signal is then analyzed as described above.

Communication between the Direction Finder 106 and SINodeB 100 is performed by means of a link 107 shown in FIG. 1. The link 107 may be a wireless or fixed wire link. In the latter case, the SINodeB 100 and Direction Finder 106 may be integrated into a single unit. In the former case, the wireless link may be a dedicated link on which data is transmitted and received automatically (that is, without human intervention). Alternatively, communication may be performed verbally by a human operator of the Direction Finder 106 telephoning a human operator of the SINodeB 100.

The invention claimed is:

1. A method of maintaining a connection between a separately introduced device and a mobile communication device registered with a network which has performed authentication and integrity procedures that ensure that the mobile communication device is confident that the network is legitimate and the network is confident that the mobile communication device is legitimate, the method comprising:
    establishing a connection with the mobile communication device by transmitting with the separately introduced device a false cell broadcast which is not under the control of the network;
    receiving a request at the separately introduced device from the mobile communication device to release the connection; and
    maintaining the connection with the mobile communication device by repeatedly sending a message from the separately introduced device to the mobile communication device to prevent the mobile communication device from releasing the connection, wherein the message is not required by the mobile communication device to be integrity protected.

2. The method of claim 1 wherein the connection is an RRC connection.

3. The method of claim 1 wherein the message is a device capability request.

4. A method of maintaining communication between a separately introduced device and a mobile cellular communication device registered with a network, the method comprising:
    establishing a connection with the mobile cellular communication device by broadcasting with the separately introduced device a first cell configured with a first location code to the mobile cellular communication device, wherein the first cell is not under the control of the network; and
    re-establishing the connection with the mobile cellular communication device after the mobile cellular communication device has released the connection by broadcasting with the separately introduced device a second cell configured with a second location code to the mobile cellular communication device, wherein the second cell is not under the control of the network.

5. The method of claim 4 further comprising detecting that the mobile cellular communication device has released the connection, and transmitting the second cell configured with the second location code in response to that detection.

6. The method of claim 4 further comprising simultaneously broadcasting the first and second cells with different location codes from two substantially co-located transmitters.

7. The method of claim 4, wherein the connection is an RRC connection.

8. The method of claim 4, wherein the location codes are LAC codes.

9. The method of claim 4, wherein the location codes are RAC codes.

10. A non-transitory computer readable medium embodied with a computer program product having instructions embedded thereon which, when executed by a processor, causes a separately introduced device not registered with a network to perform the following steps:
    establishing a connection with a mobile cellular communication device by broadcasting with the separately introduced device a first cell configured with a first location code to the mobile cellular communication device, wherein the first cell is not under the control of the network, and
    re-establishing the connection with the mobile cellular communication device after the mobile cellular communication device has released the connection by broadcasting with the separately introduced device a second cell configured with a second location code to the mobile cellular communication device, wherein the second cell is not under the control of the network.

11. A separately introduced device configured to maintain communication with a mobile cellular communication device, the separately introduced device not being registered with a network and the mobile cellular communication device being registered with the network, wherein comprising:
    a processor configured to:
        establish a connection with the mobile cellular communication device by broadcasting a first cell configured with a first location code to the mobile cellular communication device, wherein the first cell is not under the control of the network; and
        re-establish the connection with the mobile cellular communication device after the mobile cellular communication device has released the connection by broadcasting a second cell configured with a second location code to the mobile cellular communication device, wherein the second cell is not under the control of the network.

* * * * *